(12) United States Patent
Kramer et al.

(10) Patent No.: US 6,236,310 B1
(45) Date of Patent: May 22, 2001

(54) BRAKE SHOE ASSEMBLY HAVING A BRAKE LINING WEAR AND TEMPERATURE SENSOR

(75) Inventors: Dennis A. Kramer, Troy; Mark E. Malinowski, Farmington Hills, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/185,322

(22) Filed: Nov. 3, 1998

(51) Int. Cl.$^7$ ........................................................ B60Q 1/00
(52) U.S. Cl. ........................ 340/454; 340/453; 340/449; 188/1.11 R; 188/1.11 W; 188/1.11 L
(58) Field of Search ..................................... 340/454, 453, 340/449, 825.06, 825.17, 825.36; 73/121, 129, 130; 188/1.11 R, 1.11 W, 1.11 L

(56) References Cited

U.S. PATENT DOCUMENTS

| | | | |
|---|---|---|---|
| 3,902,158 | * | 8/1975 | Dahlkvist ............................. 340/454 |
| 4,606,434 | * | 8/1986 | Vasilow et al. ...................... 188/1.11 |
| 5,339,069 | * | 8/1994 | Penner et al. ........................ 340/454 |
| 5,419,415 | * | 5/1995 | Lamb et al. ......................... 188/1.11 |

* cited by examiner

Primary Examiner—Daniel J. Wu
Assistant Examiner—Toan Pham
(74) Attorney, Agent, or Firm—Carlson, Gaskey & Olds

(57) ABSTRACT

A brake shoe assembly includes a brake lining and a housing. The brake lining has a predetermined thickness which gradually wears away and increases in temperature during a vehicle braking application. The housing is positioned to wear away and increase in temperature concurrently with the brake lining. An electrical wear loop circuit is encapsulated in the housing for directing power from a power source to a remote indicator in response to a wear opening in the loop circuit. A thermally sensitive switching element is encapsulated in the housing and connected in electrical series with the wear loop circuit for directing power from the power source to the remote indicator in response to the temperature of the housing exceeding a predetermined temperature threshold. In a preferred embodiment, the switching element has a first resistance when the temperature of the housing is below the predetermined temperature threshold and a second resistance which approximates an open circuit when the temperature of the housing is above the predetermined temperature threshold. Thus, when the temperature of the housing is above the predetermined temperature threshold, the second resistance of the switching element directs power from the power source to the remote indicator.

23 Claims, 1 Drawing Sheet

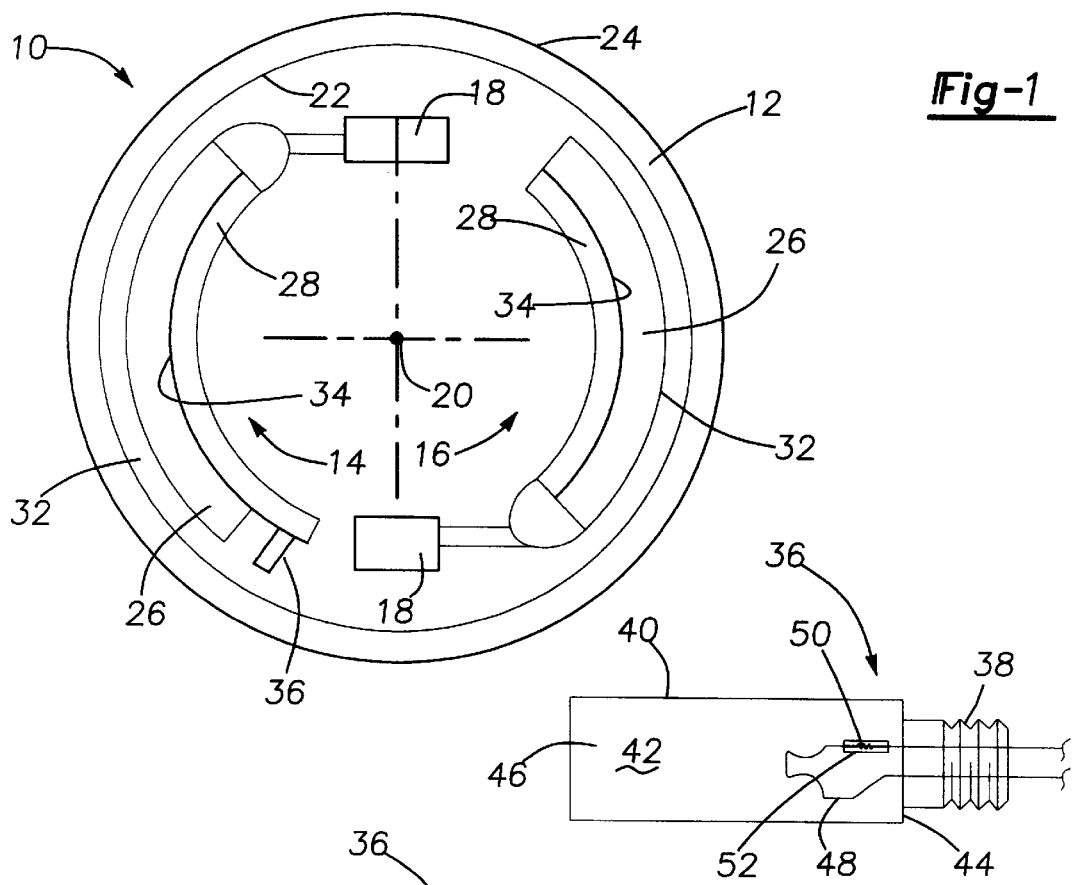
*Fig-1*
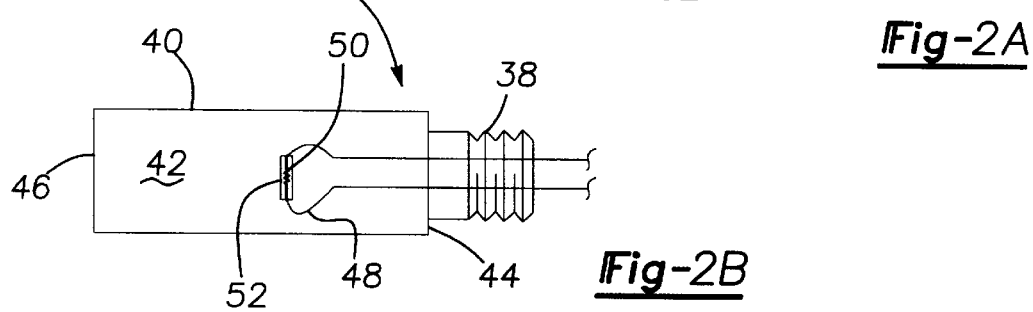
*Fig-2A*
*Fig-2B*
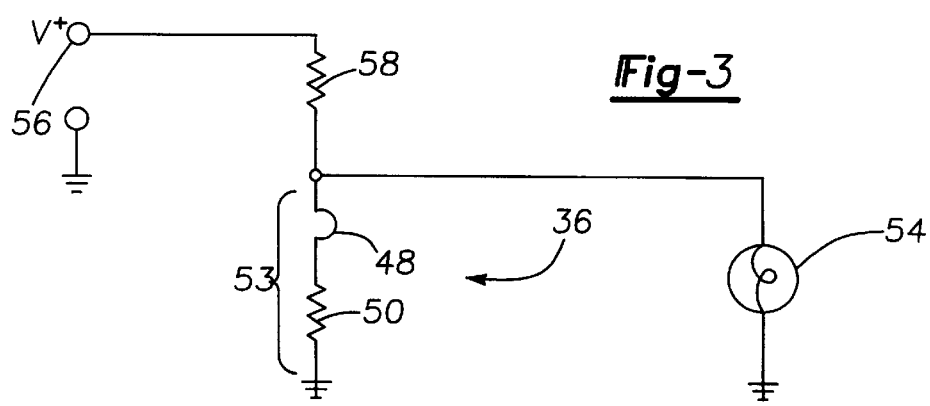
*Fig-3*

BRAKE SHOE ASSEMBLY HAVING A BRAKE LINING WEAR AND TEMPERATURE SENSOR

BACKGROUND OF THE INVENTION

This application relates to a brake shoe assembly having a sensor for determining when the brake lining of the assembly has worn below a critical thickness and when the temperature of the brake lining has exceeded a predetermined temperature threshold.

Most motor vehicles include a brake system having a set of brake shoe assemblies for retarding the rotation of the wheels of the vehicle when the brakes are applied. Typically, each brake shoe assembly includes a brake lining made of a friction material which gradually wears away during brake applications. After numerous brake applications, the brake lining wears below a critical material thickness and, therefore, should be replaced. As a result, the brake lining must be periodically inspected for excessive wear. To eliminate time-consuming and costly visual inspections of the brake lining, the prior art has taught several types of brake lining wear sensors for indicating when the brake lining must be replaced.

One type of brake lining wear sensor, sometimes referred to as a wire loop sensor, indicates when the brake lining has worn below a critical thickness. Although prior art wire loop sensors are relatively inexpensive and simple, they do not indicate the temperature of the brake lining. Accordingly, it would be desirable provide an inexpensive and simple sensor for detecting both when the brake lining has worn below a critical thickness and when the temperature of the brake lining has exceeded a predetermined temperature threshold.

SUMMARY OF THE INVENTION

In a disclosed embodiment of this invention, a brake shoe assembly for a vehicle includes a brake lining and a housing. The brake lining has a predetermined thickness which gradually wears away and increases in temperature during a vehicle braking application. The housing is positioned to wear away and increase in temperature concurrently with the brake lining. An electrical wear loop circuit is encapsulated in the housing for directing power from a power source to a remote indicator in response to a wear opening in the loop circuit. A thermally sensitive switching element is encapsulated in the housing and connected in electrical series with the wear loop circuit for directing power from the power source to the remote indicator in response to the temperature of the housing exceeding a predetermined temperature threshold.

The switching element has a first resistance when the temperature of the housing is below the predetermined temperature threshold and a second resistance which approximates an open circuit when the temperature of the housing is above the predetermined temperature threshold. Thus, when the temperature of the housing is above the predetermined temperature threshold, the second resistance of the switching element directs power from the power source to the remote indicator.

In a preferred embodiment of this invention, the switching element is a polymer positive temperature coefficient device and the assembly includes a biasing resistor connected in electrical series with the switching element to bias the predetermined temperature threshold.

These and other features of the present invention will be best understood from the following specification and drawings, the following of which is a brief description.

BRIEF DESCRIPTION OF THE DRAWINGS

FIG. 1 is a side view of a drum brake system including a brake shoe assembly having a brake lining wear and temperature sensor in accordance with the present invention.

FIGS. 2A and 2B are cross-sectional views of alternative embodiments of the brake lining wear and temperature sensor in accordance with the present invention.

FIG. 3 is an electrical schematic diagram of the brake lining wear and temperature sensor installed in a vehicle.

DETAILED DESCRIPTION OF THE PREFERRED EMBODIMENT

Referring to FIG. 1, a brake shoe assembly having a brake lining wear and temperature sensor in accordance with the present invention is shown installed in a vehicular brake system. The inventive brake shoe assembly, as described below, may be incorporated into several different types of conventional brake systems including, but not limited to, drum brake systems and disc brake systems. Thus, the brake shoe assembly has been illustrated in a drum brake system in FIG. 1 for descriptive purposes only and not to limit the scope of the present invention.

FIG. 1 is a side view of a drum brake system 10. The drum brake system 10 includes a cylindrical brake drum 12, a first brake shoe assembly generally shown at 14, a second brake shoe assembly generally shown at 16, and an actuator 18. The general operation of the brake drum assembly 10 is known. The first and second brake shoe assemblies 14 and 16 are preferably identical such that a description of the first brake shoe assembly 14 or its components is also applicable to the second brake shoe assembly 16. The drum brake system 10 can be of various types of systems such as an s-cam brake, a wedge brake, or a drum brake actuated by a hydraulic cylinder. The actuator 18, shown schematically in FIG. 1, represents any known actuating mechanism for drum brake systems such as an scam mechanism, a wedge mechanism, or a hydraulic cylinder. The actuator 18 moves the first and second brake shoe assemblies 14 and 16 into contact with the rotating brake drum 12 and can be controlled hydraulically or pneumatically. Also, as known, a single actuator could move both the first and second brake shoe assemblies 14 and 16 into contact with the rotating brake drum 12.

The brake drum 12, which rotates about an axis of rotation 20, has an inner surface 22 and an outer surface 24. The first and second brake shoe assemblies 14 and 16, located adjacent to the inner surface 22 of the brake drum 12, include a brake lining 26 having a predetermined thickness. The brake linings 26 are comprised of a known friction material attached to a backing plate 28. Each brake lining 26 presents a wear surface 32 which contacts the inner surface 22 of the rotating brake drum 12 when the actuator 18 moves the first and second brake shoe assemblies 14 and 16 against the brake drum 12. Frictional contact between the wear surfaces 32 and the rotating brake drum 12 increases the temperature of each brake lining 26 and wears away the thickness of each brake lining 26. During repetitive brake applications, the temperature of the brake linings 26 may increase beyond a critical temperature resulting in a brake fade condition. After numerous brake applications, the brake linings 26 eventually wear below a critical thickness and, therefore, must be replaced. Each brake lining 26 also includes an interface surface 34 which contacts the backing plate 28.

A brake lining wear and temperature sensor 36, shown schematically in FIG. 1, is attached to the backing plate 28 of the first brake shoe assembly 14. The sensor 36 is positioned to wear away as the brake lining 26 gradually wears away during brake applications. Frictional contact with the inner surface 22 of the rotating brake drum 12 during brake applications increases the temperature of the sensor 36 concurrently with the brake lining 26. In FIG. 1, the sensor 36 is positioned adjacent to the brake lining 26. Alternatively, the sensor 36 may be embedded or encapsulated in the brake lining 26. The sensor 36 can be incorporated in either the first and/or the second brake shoe assemblies 14 and 16, but typically need only be incorporated in the leading brake shoe assembly which experiences the most brake lining wear.

FIG. 2A is a cross-sectional view of the brake lining wear and temperature sensor 36 in accordance with the present invention. The sensor 36 includes a threaded end 38, for attachment to the backing plate 28 of the first brake shoe assembly 14, and housing 40, for wearing away and increasing in temperature concurrently with the brake lining 26 of the first brake shoe assembly 14 during brake applications. The housing 40 consists of a body of material 42 having a proximate end 44, positioned adjacent to the threaded end 38 of the sensor 36, and a distal end 46, for contacting the vehicle concurrently with the wear surface 32 of the brake lining 26. The body of material 42 preferably has a thermal conductivity approximately equal to the brake lining 26. An electrical wear loop 48 and a thermally sensitive switching element 50 are electrically connected in series and encapsulated in the body of material 42.

In this embodiment, the wear loop 48, which is well known in the art, forms a wear point generally indicated at 52. After numerous brake applications, the distal end 46 of the sensor 36 eventually wears beyond the wear point 52, thereby creating a wear opening in the wear loop 48. That is, the wear loop 48 is broken by contact with the brake drum 12.

Alternatively, the switching element 50 may be positioned at the wear point 52 as illustrated in FIG. 2B. In this alternative embodiment, the switching element 50 is located closer to the distal end 46 of the sensor 36 and, therefore, the temperature of the switching element 50 may more accurately reflect the temperature of the wear surface 32 of the brake lining 26.

FIG. 3 is an electrical schematic diagram of the brake lining wear and temperature sensor 36 installed in a vehicle. The electrical wear loop 48 and the thermally sensitive switching element 50 combine to form a switching circuit 53. The switching circuit 53 is connected electrically parallel to an indicator 54. A power source 56 provides an actuation signal for the indicator 54.

Typically, the switching circuit 53 provides the actuation signal a short circuit or low resistance path to ground. Thus, the indicator 54 is normally off. However, when the wear loop 48 is worn through or the switching element 50 is opened, the actuation signal is directed from the power source 56 to the indicator 54. Thus, when the switching circuit 53 is opened, the indicator 54 is actuated.

In a preferred embodiment of the present invention, the switching element 50 is a polymer positive temperature coefficient device having a first resistance which approximates a closed or short circuit when the temperature of the housing 40 is below a predetermined temperature threshold and a second resistance which approximates an open circuit when the temperature of the housing 40 is above the predetermined temperature threshold. Thus, when the temperature of the housing 40 is above the predetermined temperature threshold, the second resistance of the switching element directs the actuation signal from the power source 56 to the indicator 54.

Unlike conventional brake lining wear and temperature sensors, the present invention does not require additional electronic components to measure the resistance of a device, such as a temperature sensor, thermistor, resistive temperature detector, or other similar types of components, to determine the temperature of a brake lining. Thus, the present invention provides an accurate, yet inexpensive, sensor for detecting both when a brake lining has worn below a critical thickness and when the temperature of the brake lining has exceeded a predetermined temperature threshold.

A device which meets the functional and packaging requirements of the switching element 50 is manufactured by Raychem Corporation located in Menlo Park, Calif. and is commercially known as a "Polyswitch". One particular Raychem part, part number SMD030-2, is particularly adapted for integration within the present invention. This Polyswitch exhibits a sharp rise in resistance when the temperature of the Polyswitch rises above the phase change point for base material of the Polyswitch. The phase change point for this Polyswitch is approximately 220 C. Accordingly, the phase change point represents the predetermined temperature threshold in the present invention.

In a preferred embodiment of the present invention, a biasing resistor 58 is connected in electrical series with the switching element 50 to bias the predetermined temperature threshold. Thus, the resistance of the biasing resistor 58 is chosen to decrease the predetermined temperature threshold accordingly.

As illustrated in FIG. 3, the indicator 54 is a light source which provides a visual warning when actuated. Alternatively, the indicator 54 may be an alarm which produces an audible warning when actuated.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A brake shoe assembly for a vehicle comprising:
    a brake lining having a predetermined thickness which gradually wears away and increases in temperature during a vehicle braking application, said brake lining having a first thermal conductivity;
    a housing positioned to wear away and increase in temperature concurrently with said brake lining, said housing having a second thermal conductivity approximately equal to said first thermal conductivity;
    an electrical wear loop circuit encapsulated in said housing for directing power from a power source to a remote indicator in response to a wear opening in said loop circuit; and
    a thermally sensitive switching element encapsulated in said housing and connected in electrical series with said wear loop circuit for directing power from the power source to the remote indicator in response to the temperature of said housing exceeding a predetermined temperature threshold.

2. An assembly as set forth in claim 1 wherein said switching element has a first resistance when the temperature of said housing is below the predetermined temperature threshold and a second resistance which approximates an open circuit when the temperature of said housing is above the predetermined temperature threshold.

3. An assembly as set forth in claim 2 wherein said switching element second resistance directs the power from the power source to the remote indicator.

4. An assembly as set forth in claim 3 wherein said switching element is a polymer positive temperature coefficient device.

5. An assembly as set forth in claim 2 wherein said switching element first resistance approximates a short circuit when the temperature of said housing is below the predetermined temperature threshold.

6. An assembly as set forth in claim 1 wherein said housing consists of a body of wearable material having a thermal conductivity approximately equal to said brake lining.

7. An assembly as set forth in claim 1 including a biasing resistor connected in electrical series with said switching element to bias the predetermined temperature threshold.

8. An assembly as set forth in claim 7 wherein said remote indicator is in series with said biasing resistor.

9. An assembly as set forth in claim 1 wherein said electric wear loop circuit and said thermally sensitive switching element are in series such that current flows through neither said loop circuit nor said thermally sensitive switching element when said loop circuit is opened by wear.

10. An assembly as set forth in claim 9 wherein said remote indicator is in parallel to said loop circuit and said thermally sensitive switching element.

11. A brake wear and brake temperature sensing system for a vehicle brake lining comprising:
    an indicator;
    a power source providing an actuation signal for said indicator;
    a housing positioned to wear away and increase in temperature during a vehicle braking application wherein said housing consists of a body of wearable material having a thermal conductivity approximately equal to the brake lining; and
    a switching circuit encapsulated in said housing and connected electrically parallel to said indicator,
    said switching circuit consisting of an electrical wear loop connected in electrical series with a thermally sensitive switching element for directing said actuation signal from said power source to said indicator when said wear loop is opened or the temperature of said housing exceeds a predetermined temperature threshold.

12. A system as set forth in claim 11 wherein said switching element has a first resistance when the temperature of said housing is below the predetermined temperature threshold and a second resistance which approximates an open circuit when the temperature of said housing is above the predetermined temperature threshold.

13. A system as set forth in claim 12 wherein said switching element second resistance directs said actuation signal from said power source to said indicator.

14. A system as set forth in claim 11 wherein said switching element first resistance approximates a short circuit when the temperature of said housing is below the predetermined temperature threshold.

15. A system as set forth in claim 11 wherein said switching element is a polymer positive temperature coefficient device.

16. A system as set forth in claim 11 including a biasing resistor connected in electrical series with said switching element to bias the predetermined temperature threshold.

17. A system as set forth in claim 11 wherein said indicator produces a visual warning when actuated.

18. A system as set forth in claim 11 wherein said indicator produces an audible warning when actuated.

19. A brake shoe assembly for a vehicle comprising:
    a brake lining having a predetermined thickness which gradually wears away and increases in temperature during a vehicle braking application;
    a housing positioned to wear away and increase in temperature concurrently with said brake lining, said housing having of a body of wearable material with a thermal conductivity approximately equal to said brake lining; and
    a thermally sensitive switching element encapsulated in said housing for directing power from a power source to a remote indicator in response to the temperature of said housing exceeding a predetermined temperature threshold.

20. An assembly as set forth in claim 16 wherein said switching element has a first resistance when the temperature of said housing is below the predetermined temperature threshold and a second resistance which approximates an open circuit when the temperature of said housing is above the predetermined temperature threshold.

21. An assembly as set forth in claim 20 wherein sad switching element second resistance directs the power from the power source to the remote indicator.

22. An assembly as set forth in claim 20 wherein said switching element first resistance approximates a short circuit when the temperature of said housing is below the predetermined temperature threshold.

23. An assembly as set forth in claim 19 including a biasing resistor connected in electrical series with said switching element to bias the predetermined temperature threshold.

* * * * *